Figure 1:
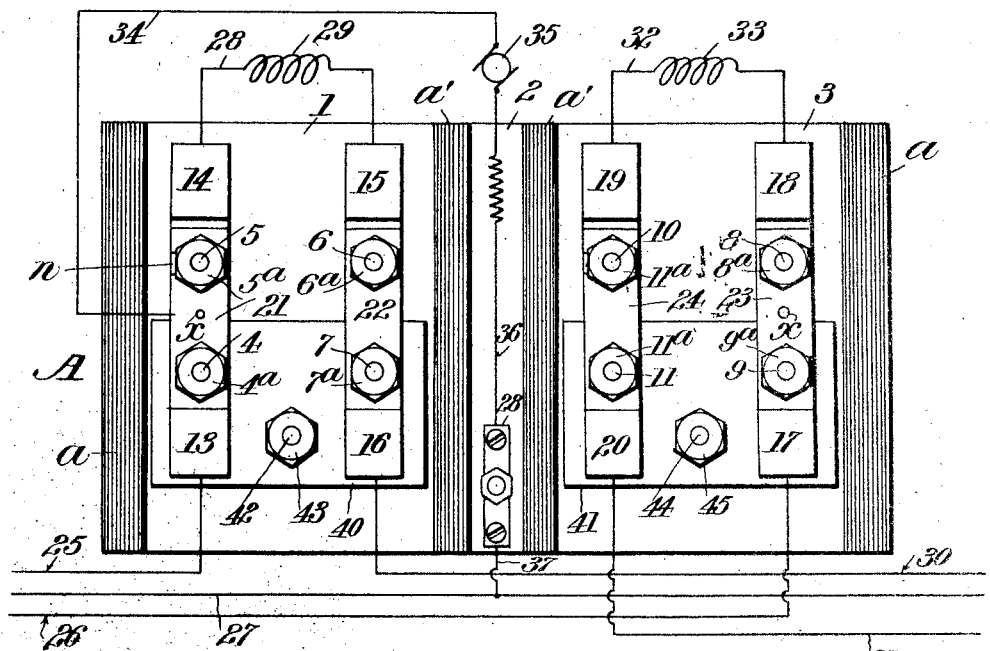

R. S. WHITE.
METER TEST BLOCK.
APPLICATION FILED APR. 10, 1914.

1,206,393.

Patented Nov. 28, 1916.
3 SHEETS—SHEET 1.

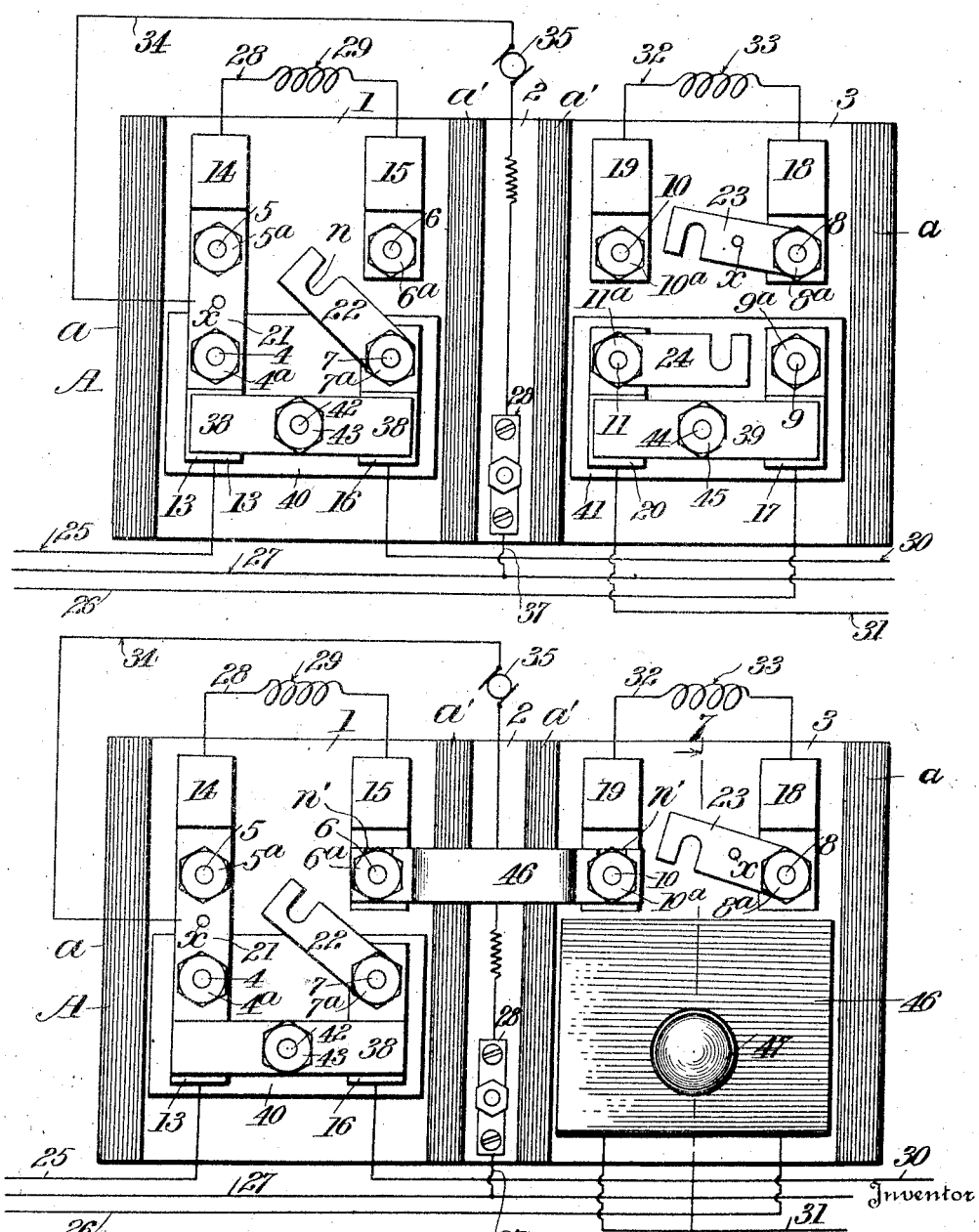

R. S. WHITE.
METER TEST BLOCK.
APPLICATION FILED APR. 10, 1914.
1,206,393.
Patented Nov. 28, 1916.
3 SHEETS—SHEET 3.
Fig. 5.
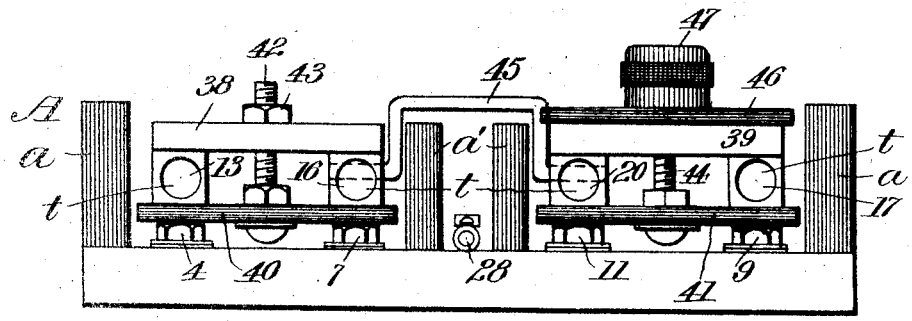
Fig. 6.
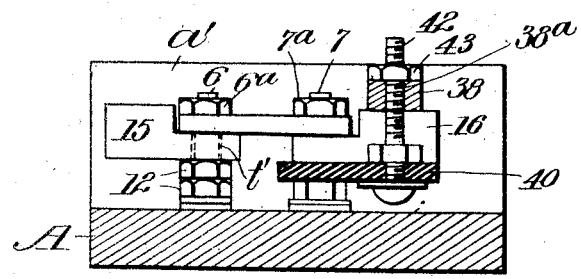
Fig. 7.
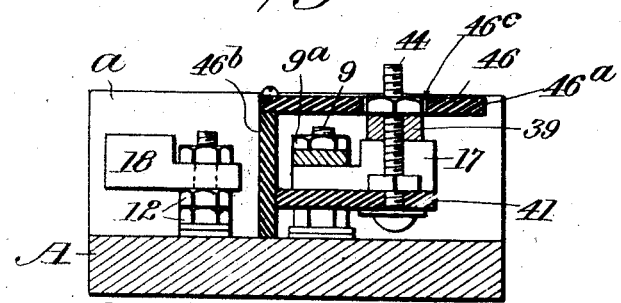
Fig. 8.
Witnesses:
Inventor:
R. S. White
By
Wm. Ton & Boyden
Attorneys

UNITED STATES PATENT OFFICE.

ROGER S. WHITE, OF WASHINGTON, DISTRICT OF COLUMBIA.

METER TEST-BLOCK.

1,206,393.  Specification of Letters Patent.  Patented Nov. 28, 1916.

Application filed April 10, 1914. Serial No. 830,976.

*To all whom it may concern:*

Be it known that I, ROGER S. WHITE, a citizen of the United States, residing at Washington, in the District of Columbia, have invented certain new and useful Improvements in Meter Test-Blocks, of which the following is a specification.

In making tests of the larger sizes of electric meters on the consumers' premises, a greater portion of the time required is ordinarily taken up in getting the meter ready for the test, *i. e.*, in attaching "jumpers" or temporary flexible wires as by-paths for the current, so as not to interrupt the supply to the consumer, and also in disconnecting the meter from the circuit, and in restoring the normal connections after the test. The heavy wires require watchful care in handling, especially as metal service or contact boxes, or conduits, or gas, water, or steam pipes are often close at hand, and an unintentional movement on the part of the tester, such as might result from a slip or accidental shock, would cause a short circuit and perhaps considerable damage. As, ordinarily, the large meters are tested more frequently than the smaller ones, this process has to be often repeated, and much of the meter tester's time is thus taken up which might better be used in the skilled work of testing the meter. Again in testing the larger direct current meters, it becomes more difficult to secure a reliable test if the meter wires are temporarily changed in position in disconnecting the meter for the test, particularly if the "jumpers" carry a heavy consumer's load at the time, for the reason that the true operating magnetic field of the meter is disturbed and distorted under these abnormal conditions. Moreover, even different meter testers may get strikingly different results, especially on light load tests, in testing the same meter, due to the manner in which the meter is jumped and the different positions of the jumpers, and perhaps also to the variation of the consumer's load carried by the "jumpers" during the different tests.

One object of my invention is to provide a meter test block adapted for use in connection with meters of the larger sizes, and which will enable the operator to quickly and safely make the necessary connections without disturbing the meter wires, and which will insure accuracy in the test.

Another object of the invention is to provide a reliable test block for meters of large size that will be simple in construction and that can be economically manufactured, since the adoption of a test block for large meters by a central station necessitates an additional expense for each such meter, and low manufacturing cost is essential to the introduction of such blocks.

In order that the invention may be clearly understood, reference is had to the accompanying drawing, forming part of this specification, and in which—

Figure 2:
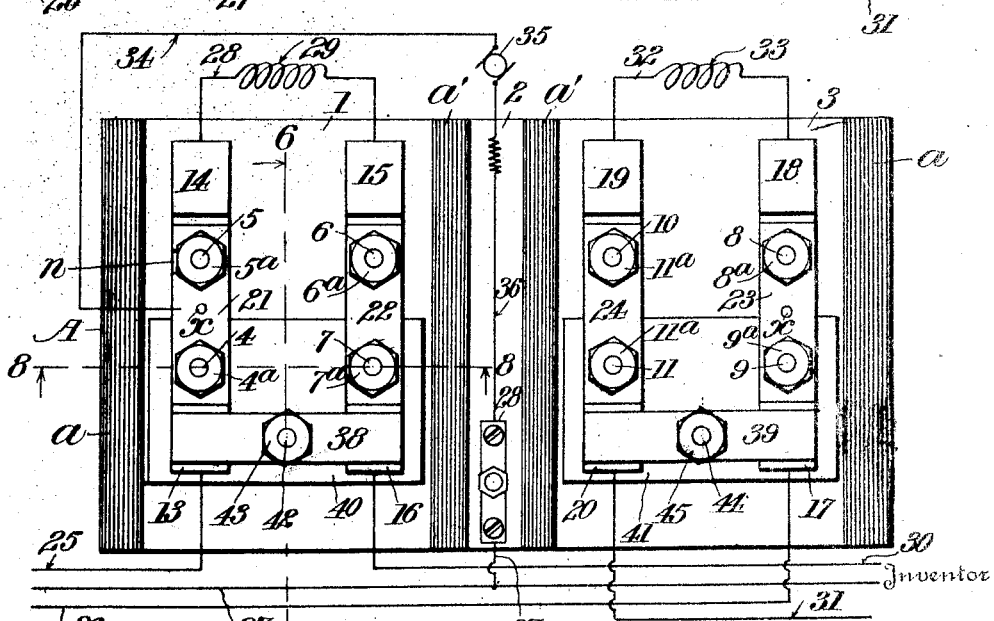

Figure 1 is a top plan view of the test block, the normal arrangement of the circuits being shown diagrammatically; Fig. 2 is a similar view of the block with the bridge pieces applied to short circuit the meter fields; Fig. 3 is a similar view of the block showing the fields short-circuited and the switch members adjusted to disconnect one field and one side of the other field of the meter; Fig. 4 is a similar view of the block as arranged for test, the fields being connected in series by a jumper and the live terminals, connected to one side of the supply system, being covered by an insulated housing; Fig. 5 is a front elevation of the test block with the parts arranged as in Fig. 4; Fig. 6 is a section on the line 6—6 of Fig. 2; Fig. 7 is a section on the line 7—7 of Fig. 4; and, Fig. 8 is a section on the line 8—8 of Fig. 2.

Referring to the drawing, A indicates a base, of insulating material, having upwardly projecting end walls $a$ and intermediate partitions $a'$. Channels 1, 2, 3, are thus formed on the block, and the terminals connected with the positive, neutral, and negative field wires are placed in these channels and separated by the partitions. Threaded rods or studs, 4, 5, 6, 7, 8, 9, 10, and 11, extend upwardly through the base, and each rod is secured firmly in upright position by lock nuts 12, as shown in Figs. 6 and 7. Upon the several studs referred to are mounted terminals blocks 13, 14, 15, 16, 17, 18, 19, and 20, which, as shown, are alike in form. Each terminal block has a longitudinal bore $t$ (Fig. 5) to receive a wire or cable, and a transverse opening $t'$ (Fig. 6) through which its supporting stud extends. Preferably the terminals are rectangular in cross section, in order to present flat broad surfaces to the co-engaging parts. Upon the upper ends of the studs are clamping nuts $4^a$ to $11^a$, inclusive. Flat connecting bars 21, 22, 23, and 24 are arranged between the clamping nuts and the terminals. These connecting bars or switches, as shown best in Figs. 3 and 4, are in the form of latches, each having one end perforated and pivoted on one of the studs, and having a transverse notch $n$ near its other end adapted to engage an adjacent stud. Thus, in the normal positions of the connectors, shown in Fig. 1, the connector 21 is pivoted on the stud 4 and its notched end engages the stud 5, and similarly, the connectors 22, 23, and 24, are pivoted upon the studs 7, 8, and 11, respectively, and engage the studs 6, 9, and 10, respectively. The clamping nuts hold the connectors firmly against the terminals and clamp the latter against the lock nuts on the studs. It will be noted that the terminals are supported at some distance from the base, and thus ample room is allowed for circulation of air around the terminals, which prevents heating. It will also be noted that each terminal is supported by a single stud, and that, owing to its pivoted connection with the stud, the terminal can be adjusted slightly about its pivotal point, which is desirable, owing to the fact that heavy wires or cables, which are not easily bent, are fitted to the terminals, in practice.

Referring to the circuit diagram, Fig. 1, the positive supply wire 25 is shown connected to the supply terminal 13, and the negative supply wire 26 is connected to the supply terminal 17, while the neutral wire 27 is connected to a terminal block 28, secured to the base in the channel 2. When the meter is in operation, the circuits are as follows: from the supply wire 25, through supply terminal 13 and connector 21 to meter terminal 14, thence through conductor 28 and meter field 29 to meter terminal 15; thence through connector 22 and house terminal 16 to house wire 30, thence returning through house wire 31 to house terminal 20, thence through connector 24, meter field terminal 19, conductor 32, and meter field coil 33 to meter field terminal 18; thence through connector 23 to supply terminal 17, and thence to negative supply wire 26. The armature circuit of the meter proceeds from supply wire 25 and terminal 13, through conductor 34 to the armature 35 of the meter, and thence through conductor 36 to the armature terminal 28, which is connected by conductor 37 to the neutral wire 27 of the supply circuit. It will be evident that when the parts are in the position shown in Fig. 1, the meter will be operatively connected between the supply and house wires.

The first step in preparing the meter for test, is to short circuit the meter fields, as illustrated in Fig. 2, and for this purpose two detachable bridge pieces 38 and 39 are provided. The former is shown in Fig. 2 connecting the feed terminal 13 with the house terminal 16 and short circuiting the field winding 29, and the latter is shown connecting the feed terminal 17 with the house terminal 20 and short circuiting the field coil 33. These bridge pieces consist of flat metal bars which may be conveniently carried by the meter tester and applied when the test is to be made. In order to clamp the bridge pieces firmly against the terminals, without straining the terminals or their supporting bolts, clamping plates or members 40 and 41, of insulating material, alike in construction, are arranged beneath the terminals. The clamping member 40, as shown in Fig. 8, is provided with openings 40ª which, in assembling the block, will pass over the studs 4 and 7, and the lock nuts thereon, and thus the clamping member becomes loosely held in place upon the block. The member 41 is perforated in a similar manner and held in place by the studs 11 and 9. Secured to the member 40, midway between the terminals 13 and 16, is an upright clamping bolt or stud 42 which extends through an opening 38ª in the bridge piece 38 when the latter is placed upon the terminals. A clamping nut 43 is provided, and by means of this nut, after the bridge piece 38 has been placed in position, the insulated clamping member 40 may be drawn up against the under sides of the terminals 13 and 16, and the bridge piece firmly clamped against the terminals to make good electrical contacts. This firm contact is secured without exerting any pressure upon the supporting bolts 4 and 7, or in any way straining the connections between the bolts and the terminals, as might happen if the studs 42 were fixed to the base instead of to the loosely mounted insulated clamping member. The clamping member 41 is also provided with a vertical threaded stud 44, midway between the terminals 17 and 20, and the bridge piece 39 is clamped against said terminals in the same way as the bridge piece 38 is clamped against its terminals.

The second step in preparing the meter for test is to disconnect the fields, and this is accomplished with the test block of my invention, as shown in Fig. 3, by swinging the connectors 22, 23, and 24 inwardly away from their normal positions so as to break the connections between the house and field terminals and between one side of the supply circuit and one of the field terminals. Thus, it will be evident, that when the connectors 22, 23, and 24, are swung inward away from their normal positions, one end of the field winding 29 will be disconnected from the house wire 30 and and the field coil 33 will be entirely disconnected from the supply wire 26 and the house wire 31.

The third step in preparing the meter for test, is to connect the meter field coils in series, and for this purpose a jumper or bridge piece 45 is provided. This bridge piece, as shown, is bent so that its ends may lie flatly against the terminals 15 and 19, while its central portion extends over the partitions *a'*. This bridge piece is provided with lateral notches *n'*, so that it may be slid edgewise under the clamping nuts on the studs 6 and 10, after the latches 22 and 24 have been swung to one side. It will be evident that when the bridge piece is in place and clamped against the terminals, the fields 29 and 33 will be in series, and the meter is then ready for testing.

After disconnecting the fields, and before applying the bridge piece 45, as a means for insuring against accidental short circuits, I provide a detachable housing of insulating material 46, which fits over one of the supply terminals and the parts electrically connected therewith so that connection cannot be made between the positive and negative supply terminals by accidental dropping or movement of the connecting piece 45. This housing, as shown, consists of two plates of insulating material 46ª and 46ᵇ secured together at right angles, and of such length as to fit neatly between the walls of the channel 3 on the base, the vertical portion 46ᵇ of the housing being adapted to extend downwardly between the meter field terminals 18 and 19, and the feed terminal 17 and house terminal 20, so as to separate the latter terminals from the field terminals. The top of the housing has an opening 46ᵉ through which the stud 44, and the clamping nut thereon extend when the housing is in position upon the base. To hold the housing firmly in its position, a knob 47 of insulating material is provided and adapted to thread on to the stud 45 and press the top of the housing against the bridge piece 39. Thus, it will be seen that when the housing is in position on the test block, all the parts connected with one side of the supply circuit are covered so that there is no danger of short circuits occurring in connecting the fields in series or in making the tests. The armature field terminal 28 lies in a narrow and relatively deep channel, and the form and size of the connecting bar 45 is such that if carelessly dropped, it could not connect this terminal with any of the terminals or parts in the channel 1, which parts all usually remain connected to one side of the supply circuit, since there is no necessity for disconnecting both ends of the field 29.

The construction of the test block and the operation of making the connections to test the meter will be clear from the foregoing description, and it will be understood that after the test, the parts will be restored to their normal positions by reversing the steps described, that is, first removing the connecting bar 45, then restoring the latches 22, 23, and 24 to their normal positions, and then removing the short circuiting bars or bridge pieces 38 and 39. The detachable parts 38—39 and 45—46 will be carried as a part of the meter tester's kit, to be applied to any similar test block when a test is to be made. For convenience in connecting the test meter to the test block, the connecting members 21 and 23 are perforated as shown at *x*, so that the leads from the test meter may be hooked into these openings.

What I claim is:

1. In a meter test block, a suitable base, a plurality of studs secured to and projecting therefrom, and supply, house, and meter terminals, each supported on one of said studs and spaced away from the base.

2. In a meter test block, a suitable base, a plurality of studs secured to and projecting therefrom, supply, house and meter terminals each mounted separately on one of said studs and spaced away from the base, connecting bars each adapted to engage two adjacent studs and to rest against the terminals thereon, and means on the studs for clamping the connecting bars against the terminals.

3. In a meter test block, a base, a supply terminal thereon, a house terminal adjacent said supply terminal, an insulated clamping member loosely connected with the block and arranged at one side of said terminals, a stud secured to said member and projecting outwardly between the terminals, a metal bridge piece adapted to rest on the opposite sides of said terminals and perforated to receive the stud, and means on the stud for forcing said member and bridge piece against the terminals.

4. In a meter test block, a suitable base, studs projecting therefrom, supply and house terminals secured thereto, an insulated clamping member connected to the block beneath each supply terminal and an adjacent house terminal, a stud secured to each clamping member and projecting outwardly between the adjacent supply and house terminals, metal bridge pieces, each adapted to engage the outer sides of adjacent supply and house terminals and having a central opening to receive the stud, and means on the studs for clamping said members and bridge pieces against the terminals.

5. In a meter test block, a suitable base, supply, house and field terminals thereon, means for short-circuiting the meter fields, means for making and breaking the connections between the field terminals and the supply and house terminals, a housing adapted to cover the supply and house terminals connected with one side of the line, and means for connecting the fields in series.

6. In a meter test block, a suitable base, supply terminals thereon, a house terminal adjacent each supply terminal, an insulated clamping member beneath one supply terminal and its adjacent house terminal, a stud projecting from said member, a housing adapted to cover the latter terminals and having an opening to receive said stud, and means on the stud for locking the housing to the base.

In testimony whereof I have affixed my signature, in presence of two witnesses.

ROGER S. WHITE.

Witnesses:
ROBERT WATSON,
C. VAN SANT.